| (12) | United States Patent | (10) Patent No.: | US 10,746,199 B2 |
|---|---|---|---|
| | Huber et al. | (45) Date of Patent: | *Aug. 18, 2020 |

(54) HYDRAULIC MODULE FOR CONTROLLING A HYDRAULIC FLUID FLOW OF A CONNECTING ROD FOR AN INTERNAL COMBUSTION ENGINE WITH VARIABLE COMPRESSION AND A CONNECTING ROD

(71) Applicant: ECO Holding 1 GmbH, Marktheidenfeld (DE)

(72) Inventors: David Huber, Aschaffenburg (DE); Dietmar Schulze, Muenzenberg (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 89 days.

This patent is subject to a terminal disclaimer.

(21) Appl. No.: 15/863,897

(22) Filed: Jan. 6, 2018

(65) Prior Publication Data

US 2018/0202469 A1 Jul. 19, 2018

(30) Foreign Application Priority Data

Jan. 18, 2017 (DE) .......................... 10 2017 100 859
Sep. 15, 2017 (DE) .......................... 10 2017 121 432

(51) Int. Cl.
*F15B 11/18* (2006.01)
*F02B 75/04* (2006.01)
(Continued)

(52) U.S. Cl.
CPC ............ *F15B 11/18* (2013.01); *F02B 75/045* (2013.01); *F15B 13/027* (2013.01); *F16C 7/06* (2013.01);
(Continued)

(58) Field of Classification Search
CPC ...... F02B 75/045; F15B 11/18; F15B 13/027; F15B 2211/7052; F15B 2211/71;
(Continued)

(56) References Cited

U.S. PATENT DOCUMENTS 2,989,954 A * 6/1961 Hulbert .................. F02B 75/04
123/48 B
3,245,221 A * 4/1966 James ....................... B60T 8/26
60/564

(Continued)

FOREIGN PATENT DOCUMENTS

CN 1037011 A 11/1989
CN 1982679 A 6/2007
(Continued)

*Primary Examiner* — Mary E McManmon
*Assistant Examiner* — Richard K. Durden
(74) *Attorney, Agent, or Firm* — Von Rohrscheidt Patents (57) ABSTRACT

A hydraulic module configured to control a hydraulic fluid flow of a connecting rod of an internal combustion with variable compression, the connecting rod including an eccentrical element adjustment arrangement for adjusting an effective connecting rod length, wherein the eccentrical element adjustment arrangement includes at least a first cylinder and a second cylinder configured as hydraulic chambers, wherein a first inlet for feeding hydraulic fluid into the first cylinder through a supply conduit and a second inlet for feeding hydraulic fluid into the second cylinder through the supply conduit and a first outlet for draining hydraulic fluid from the first cylinder and a second outlet for draining hydraulic fluid from the second cylinder are provided, wherein the hydraulic module includes at least one piston that is displaceable in a housing into a first switching position or a second switching position.

13 Claims, 9 Drawing Sheets

(51) Int. Cl.
    *F15B 13/02*    (2006.01)
    *F16C 7/06*    (2006.01)
    *F16K 15/14*    (2006.01)
    *F16K 3/24*    (2006.01)

(52) U.S. Cl.
    CPC ............... *F15B 2211/30505* (2013.01); *F15B 2211/7052* (2013.01); *F15B 2211/71* (2013.01); *F16K 3/24* (2013.01); *F16K 15/142* (2013.01)

(58) Field of Classification Search
    CPC ...... F15B 2211/7107; F15B 2211/7121; F15B 2211/8646; F16C 7/06; F16C 23/10; F16K 3/24; F16K 15/142
    USPC ............................................ 137/512.15, 860
    See application file for complete search history.

(56) References Cited

U.S. PATENT DOCUMENTS

| | | | | |
|---|---|---|---|---|
| 3,298,394 | A | * | 1/1967 | Chorkey ............... F16K 15/142 137/860 |
| 3,623,776 | A | * | 11/1971 | Wellman ................... B60T 8/26 303/9.73 |
| 3,848,620 | A | * | 11/1974 | Fisher ................... F15B 11/022 137/116.3 |
| 8,505,582 | B2 | | 8/2013 | Hilite |
| 10,330,005 | B2 | * | 6/2019 | Mudra .................. F02B 75/045 |
| 2004/0226526 | A1 | * | 11/2004 | Palesch ................. F01L 1/3442 123/90.17 |
| 2015/0059683 | A1 | * | 3/2015 | Schulze ................ F02B 75/045 123/197.3 |
| 2015/0075497 | A1 | * | 3/2015 | Hutzelmann ......... F02B 75/044 123/48 A |
| 2015/0260094 | A1 | * | 9/2015 | Wittek .................. F02B 75/045 123/48 B |
| 2017/0022895 | A1 | * | 1/2017 | Balling ................. F16K 27/041 |
| 2017/0082021 | A1 | * | 3/2017 | Schaffrath ............. F02B 75/045 |

FOREIGN PATENT DOCUMENTS

| | | |
|---|---|---|
| CN | 101059119 A | 10/2007 |
| CN | 101403342 A | 4/2009 |
| DE | 102012020999 A1 | 1/2014 |
| DE | 102013103685 | 10/2014 |
| DE | 102013206512 A1 | 10/2014 |
| DE | 102013107127 A1 | 1/2015 |
| DE | 102015100662 | 6/2016 |
| EP | 2821619 A1 | 1/2015 |
| WO | WO2016058600 A1 | 4/2016 |
| WO | WO2016103554 | 6/2016 |
| WO | WO2016127984 A1 | 8/2016 |

* cited by examiner

HYDRAULIC MODULE FOR CONTROLLING A HYDRAULIC FLUID FLOW OF A CONNECTING ROD FOR AN INTERNAL COMBUSTION ENGINE WITH VARIABLE COMPRESSION AND A CONNECTING ROD

RELATED APPLICATIONS

This application claims priority from and incorporates by reference German patent applications
DE 10 2017 100 859 filed on Jan. 18, 2017 and
DE 10 2017 121 432 filed on Sep. 15, 2017.

FIELD OF THE INVENTION

The invention relates to a hydraulic module for controlling a hydraulic fluid flow of a connecting rod for an internal combustion engine with variable compression with an eccentrical element adjustment device for adjusting an effective connecting rod length and a connecting rod with the hydraulic module.

BACKGROUND OF THE INVENTION

In internal combustion engines a high compression ratio has a positive effect upon efficiency of the internal combustion engine. Compression ratio is typically designated as a ratio of an entire cylinder volume before compression divided by a remaining cylinder volume after the compression. In internal combustion engines with external ignition in particular gasoline engines which have a fixed compression ratio, the compression ratio, however, must only be selected up to a level where a so called knocking of the internal combustion engine under full load operations is avoided. However, the compression ratio can be selected with higher values for the much more prevalent partial load operation of the internal combustion engine thus with a low cylinder charge, without the knocking occurring. The important partial load operations of an internal combustion engine can be improved when the compression ratio is variably adjustable. In order to adjust the compression ratio systems with variable connecting rod length are known.

A hydraulic module for a connecting rod for an internal combustion engine with variable compression with an eccentrical element adjustment device for adjusting an effective connecting rod length is known for example from DE 10 2012 020 999 A1.

BRIEF SUMMARY OF THE INVENTION

Thus, it is an object of the invention to provide a hydraulic module for a connecting rod for an internal combustion engine with variable compression with an eccentrical element adjustment device for adjusting an effective connecting rod length wherein the hydraulic module has stable operating properties.

It is another object of the invention to provide an improved connecting rod with the hydraulic module.

The object is achieved by a hydraulic module configured to control a hydraulic fluid flow of a connecting rod of an internal combustion with variable compression, the connecting rod including an eccentrical element adjustment arrangement for adjusting an effective connecting rod length, wherein the eccentrical element adjustment arrangement includes at least a first cylinder and a second cylinder configured as hydraulic chambers, wherein a first inlet for feeding hydraulic fluid into the first cylinder through a supply conduit and a second inlet for feeding hydraulic fluid into the second cylinder through the supply conduit and a first outlet for draining hydraulic fluid from the first cylinder and a second outlet for draining hydraulic fluid from the second cylinder are provided, wherein the hydraulic module includes at least one piston that is displaceable in a housing into a first switching position or a second switching position, wherein the second outlet of the second cylinder is connected with the supply conduit in the first switching position and the first outlet of the first cylinder is connected with the supply conduit in the second switching position, wherein the first cylinder is associated with a first check valve and the second cylinder is associated with a second check valve which facilitates feeding hydraulic fluid into the first cylinder and the second cylinder and prevents a draining of the hydraulic fluid from the first cylinder and the second cylinder, and wherein the first cylinder and the second cylinder are connected so that a hydraulic fluid flow is conductible in the second switching position from the first cylinder into the second cylinder through a channel in the hydraulic module.

The object is also achieved by a connecting rod for an internal combustion engine with variable compression with an eccentrical element adjustment arrangement for adjusting an effective connecting rod length, the connecting rod including the hydraulic module recited supra, wherein the eccentrical element adjustment arrangement includes at least a first cylinder and a second cylinder, and wherein a first inlet for feeding hydraulic fluid into the first cylinder and a second inlet for feeding hydraulic fluid into the second cylinder through a supply conduit, a first outlet for draining the hydraulic fluid from the first cylinder and a second outlet for draining the hydraulic fluid from the second cylinder are provided.

Advantageous embodiments and advantages of the invention can be derived from the dependent claims, the description and the drawing figure.

According to an embodiment of the invention a hydraulic module is proposed for controlling a hydraulic fluid flow of a connecting rod for an internal combustion engine with variable compression with an eccentrical element adjustment device for adjusting an effective connecting rod length, wherein the eccentrical element adjustment device includes at least a first cylinder and a second cylinder configured as hydraulic chambers and wherein a respective inlet for feeding hydraulic fluid into the cylinders through a supply conduit as well as a respective outlet for draining hydraulic fluid from the cylinders are provided. On a module side at least one piston is provided that is movable in a housing wherein the piston is optionally movable into a first switching position or a second switching position wherein an outlet of the second cylinder is connected with the supply conduit in the first switching position and an outlet of the first cylinder is connected with the supply conduit in the second switching position. The cylinders are respectively associated with a check valve which facilitates feeding hydraulic fluid into the cylinders and prevents a draining of hydraulic fluid from the cylinders. Thus, the cylinders are connected so that hydraulic fluid is conductible in the first switching position from the first cylinder into the second cylinder through a channel in the hydraulic module.

At a first operating connection of the hydraulic module according to the invention the first cylinder forming a hydraulic chamber of the adjustable connecting rod, for example a cylinder on a gas force side (GKS) of the connecting rod, can be connected and at the second operating connection the second cylinder can be connected as a hydraulic chamber, for example a cylinder on the mass force side (MKS) of the connecting rod, The respective chambers are typically designated as GKS chamber or MKS chamber.

A speed driven acceleration of the rather tall hydraulic fluid columns arranged in the connecting rod and made of the motor oil used as hydraulic fluid can generate pressure differences. These can have positive and negative effects, this means the hydraulic fluid columns can be accelerated so that emptying and filling of the hydraulic chambers of the cylinders of the connecting rod is supported but also so that the emptying and the filling is impeded. In particular for a cylinder on the mass force side (MKS) of the connecting rod this effect can have negative consequences. The acceleration of the hydraulic fluid columns can have the effect that no positive pressure difference is formed anymore upstream and downstream of the MKS side check valve wherein the positive pressure difference causes hydraulic fluid to be fed into the MKS chamber. Since the chambers always loose hydraulic fluid through leakage and other effects an incremental slow adjustment of the eccentrical element over several revolutions and thus of an effective length of the connecting rod from a position with low compression ($\varepsilon_{low}$) which corresponds to the first switching position of the hydraulic module into a position with high compression ($\varepsilon_{high}$) which corresponds to the second switching position of the hydraulic module. This is called drifting. This occurs in particular for engine load cases with high mass forces (tension force and compression force at the piston) and low gas forces (compression force at the connecting rod). An optional adjustment of the connecting rod in a direction of high compression through the mass forces in tension direction cannot be reset completely by the mass forces in compression direction and the gas forces.

This effect can be advantageously prevented by the hydraulic module according to the invention since the GKS chamber can conduct hydraulic fluid that is fed in the low compression position (Flow) directly and without throttling into the MKS chamber. This can be done because the hydraulic fluid that is pressed by the GKS chamber into the MKS chamber in pressure direction due to the gas and mass forces at the connecting rod has a much higher pressure than the hydraulic fluid pressure of the hydraulic supply in the bearing shell of the connecting rod. Thus, the hydraulic fluid can be pressed from the GKS chamber into the MKS chamber.

In addition to the position stability of the eccentrical element adjustment device of the connecting rod in the position $\varepsilon_{low}$, this means that the connecting rod is back in its end position $\varepsilon_{low}$ after a revolution also the position stability over the revolution or the stiffness of the connecting rod can be increased. Namely during a revolution there is always a movement of the eccentrical element lever since the hydraulic fluid columns also have a certain amount of flexibility and there always is a particular sinking of the support piston in the filled chamber. When the piston is reset completely until the end of the revolution this is called position stable. Still, the respective support piston can hit the chamber base upon an angle change at the eccentrical element or the lever assembly during resetting which can have a negative effect upon service life. Therefore adjustment speed of the eccentrical element adjustment device can be limited by throttling locations in the hydraulic conduits. A pressure loaded preloaded MKS hydraulic fluid column advantageously sinks less than a non-preloaded hydraulic fluid column. Less sinking means less lever movement which can improve position stability in the position $\varepsilon_{low}$.

The hydraulic module according to the invention represents an advantageous solution for preloading the MKS chamber in combination with a hydraulic switch valve and integrated check valves. It is an advantageous feature that the hydraulic fluid supply of the MKS chamber can be deactivated or activated in a step piston of the hydraulic module. Thus, face bore holes introduced into the housing of the hydraulic module are connected with each other.

The hydraulic module according to the invention advantageously facilitates a hydraulic adjustment of a connecting rod through a quasi-static adjustment of the hydraulic pressure in the bearing shells. Through the adjustment of the hydraulic pressure at the supply connection the step piston is moved axially against a direction of the spring force or in the direction of the spring force and thus opens or closes the GKS or MKS drain bore holes in order to initiate the eccentrical element adjustment.

The step piston is furthermore provided with a circumferential groove which connects bore holes that are already introduced into the housing in a defined switching position ($\varepsilon_{low}$) with one another and thus facilitates a pre loading of the MKS chamber.

Furthermore the band check valves are arranged along an outer circumference of the hydraulic module wherein the band check valves simplify the overall system of the connecting rod. The band elements can be advantageously provided with slots or holes in order to facilitate sufficiently large flow cross sections and a high level of functionality with a compact installation space using similar band stiffness. Thus, advantageously only three bore holes are required in the connecting rod base element.

In order to seal the additionally introduced bore holes against each other in an outward direction a closure ring in combination with a seal disc can be introduced into the housing and can be welded together with the housing on a face side.

An additional alternative hydraulic module can push two inclined planes on top of each other in one of the two end positions of the step piston wherein the inclined planes in turn deactivate or activate a hydraulic fluid connection.

According to an advantageous embodiment a switching element can be provided in the piston to control the hydraulic fluid flow in the channel. Through the switching element in the piston the hydraulic fluid supply of the MKS chamber can be advantageously deactivated or activated. The switching element connects the bore holes introduced into the housing in one of the two switching position, advantageously in the first switching position for low compression $\varepsilon_{low}$ and thus facilitates preloading the MKS chamber.

According to an advantageous embodiment the switching element can be provided as a shaped contour on the piston. As an alternative for example to a circumferential groove in the step piston a shape contour can also be provided on the step piston which opens a spring supported slide or slide system when a predetermined stroke is exceeded wherein the slide in turn facilitates a connection between the MKS chamber and the GKS chamber.

According to an advantageous embodiment a circumferential groove the piston can be provided as a switching element wherein the circumferential groove forms a portion of the channel. The circumferential groove can connect bore holes introduced into the housing in one of the two switching position, advantageously in the second switching position $\varepsilon_{low}$ and can thus advantageously facilitate a preload of the MKS chamber.

According to an advantageous embodiment the hydraulic fluid flow in the channel can be switchable by the circumferential groove through an axial movement of the piston into the first switching position or the second switching position. Thus, advantageously the drain bore holes of the GKS chamber and the MKS chamber can be opened or closed in order to initiate an eccentrical element adjustment, According to an advantageous embodiment the drain of the first cylinder can be connectable in the second switching position through the circumferential groove with the inlet of the second cylinder. Thus, the connecting rod can be advantageously switched into a low compression position $\varepsilon_{low}$ in that the hydraulic fluid is conductible in an unthrottled manner from the GKS chamber into the MKS chamber.

According to an advantageous embodiment the drain of the first cylinder is connectable in the second switching position through a transversal face bore hole and/or through a slanted bore hole with the circumferential groove. Advantageously the hydraulic conduits in the housing of the hydraulic module can be connected through the circumferential groove through transversal bore holes and/or slanted bore holes. This way a very compact configuration of the hydraulic module can be facilitated.

According to an advantageous embodiment face bore holes of the housing can be provided sealed by an annular seal disc and/or a closure ring. Thus, a permanent sealing of the bore holes can be provided so that a reliable function of the eccentrical element adjustment mechanism can be provided long term.

According to an advantageous embodiment the check valves can be integrated into the hydraulic module. The integration of the check valves in the hydraulic module yields a particularly compact configuration of the entire hydraulic arrangement of the connecting rod since only the combined feed conduits and outlet conduits of the hydraulic chambers and a supply conduit have to be provided in the connecting rod base element and/or connecting rod cover.

According to an advantageous embodiment at least one of the check valves can include an essentially annular band element as a closure element wherein the band element envelops the housing at least partially on its circumference and wherein the band element is at least partially supported at the housing and by which operating connections are closeable in a closed position. A so called band check valve of this type represents a particularly compact embodiment of a check valve and additionally facilitates a particular compact configuration of the hydraulic module including an integration into the connecting rod base element and/or the connecting rod cover.

According to an advantageous embodiment the at least one check valve can open in a radially outward direction. A band check valve of this type can be arranged in a particularly advantageously manner on the outer circumference of the housing of the hydraulic module. The check valve can be mounted very easily this way and yields a compact configuration of the hydraulic module.

According to an advantageous embodiment the band element can include at least one radial opening that is arranged in its circumferential surface. This way a compact installation space, constant functionality and similar band stiffness can be achieved and parallel throttling locations to the check valves can be implemented in a particularly advantageous manner.

According to an advantageous embodiment the opening can be provided in the circumferential direction as a slotted hole. An advantageous throttling location in a band element of the check valve represents a slotted hole which defines the flow resistance by its length wherein the flow resistance can be varied in a suitable manner by the geometric configuration.

According to an advantageous embodiment the band element can include at least one groove that is arranged at its circumference on a radial inside. A groove arranged at the inside of the band element represents an advantageous alternative to an opening like a bore hole or a slotted hole in the circumferential direction of the band element.

According to another aspect of the invention a connecting rod is proposed for an internal combustion engine with variable compression with an eccentrical element adjustment device for adjusting and effective connecting rod length by a hydraulic module. The eccentrical element adjustment arrangement includes at least a first cylinder and a second cylinder. Thus an inlet for feeding hydraulic fluid into the cylinder through a supply conduit as well as a respective drain for draining hydraulic fluid from the cylinders are provided.

The connecting rod according to the invention advantageously requires only three hydraulic conduits in the connecting rod base element which facilitates cost effective fabrication. Furthermore advantageously only a 3/2 way valve is required as a switch valve in the hydraulic module which advantageously simplifies the configuration of the connecting rod. The MKS hydraulic chamber can be preloaded by the GKS hydraulic chamber in the first switching position with low compression ($\varepsilon_{low}$). Advantageously only this way differential volumes of hydraulic fluid are exchanged between the GKS and MKS hydraulic chamber with the bearing shell of the connecting rod, this means no additional hydraulic fluid flows through the hydraulic fluid conduits in the bearing shells. Check valves and throttles can be advantageously integrated into the configuration of the hydraulic module. Thus, the hydraulic diagram for both variants can be arranged without or with the additional check valve in a hydraulic module.

BRIEF DESCRIPTION OF THE DRAWINGS

Further advantages can be derived from the subsequent drawing description. The drawings schematically illustrate the embodiment of the invention. The drawings, the description and the claims include numerous features in combination. The person skilled in the art will advantageously view the features individually and combine them into additional useful combinations, wherein:

DETAILED DESCRIPTION OF THE INVENTION

In the drawing figures identical or like components are designated with identical reference numerals. The figures only illustrate exemplary embodiments and do not limit the scope and spirit of the invention.

Figure 1:
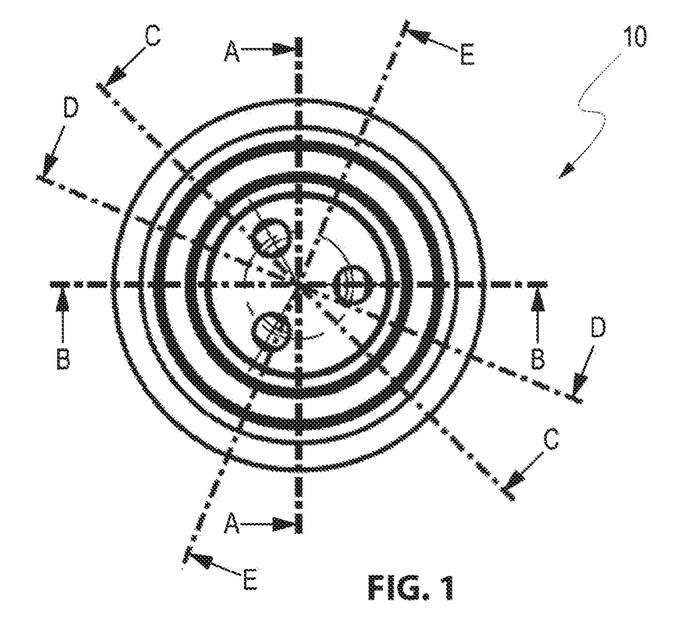
FIG. 1 illustrates a side view of a hydraulic module according to the invention with sectional planes of the longitudinal sections drawn that are illustrated in FIG. 3 FIG. 17
Figure 2:
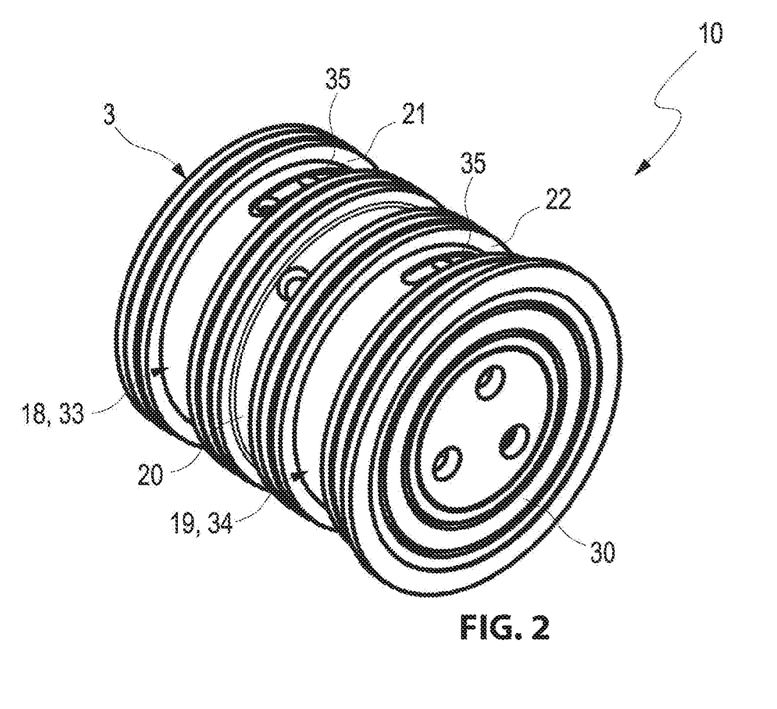
FIG. 2 illustrates the hydraulic module according to FIG. 1 in a perspective view.
Figure 3:
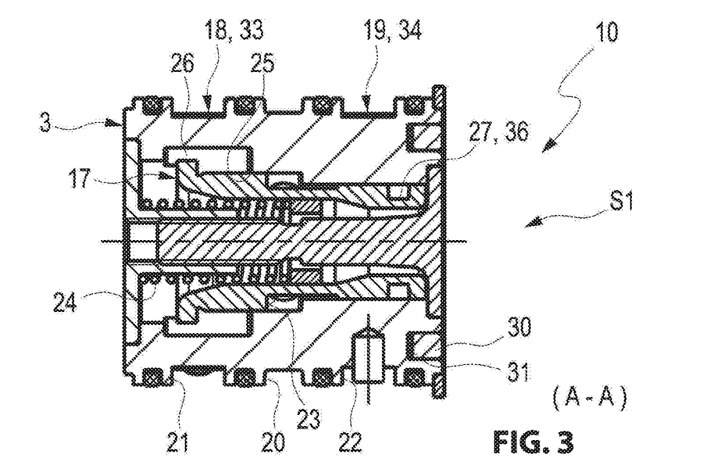
FIG. 3 illustrates a longitudinal sectional view in the sectional plane A-A of the hydraulic module according to FIG. 2 in a first switching position.

FIGS. 1-17 illustrates a hydraulic module 10 according to the invention in different views and sectional views. Thus, FIG. 1 illustrates a side view of the hydraulic module 10 with different sectional planes drawn which are used for the illustrations in FIGS. 3-17, whereas FIG. 2 illustrates the hydraulic module of FIG. 1 in a perspective view. FIGS. 3-7 illustrate the hydraulic module 10 in the first switching position S1 for high compression $\varepsilon_{high}$ and FIGS. 13-17 in a second switching position S2 for low compression $\varepsilon_{low}$. FIGS. 8-12 illustrate the hydraulic module 10 or the corresponding sectional views during a switching process, this means in a position between the two switching positions S1 and S2. Respective hydraulic diagrams of a connecting rod 1 according to the invention can be derived from FIGS. 18 and 19.

Figure 18:
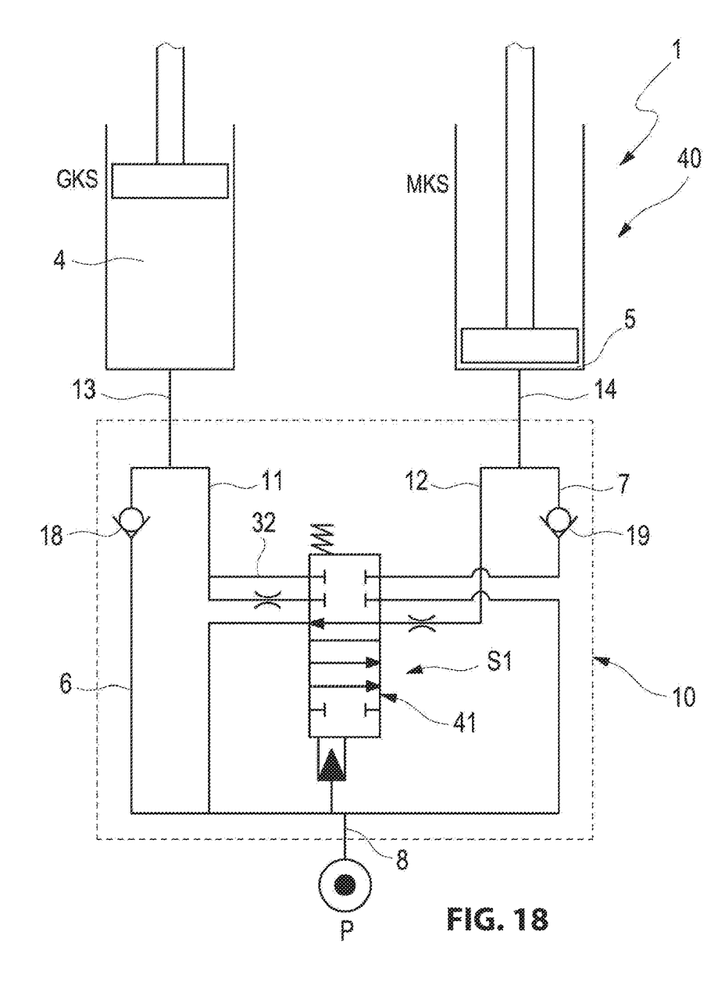
FIG. 18 illustrates a hydraulic diagram of a connecting rod according to the invention with the hydraulic module according to FIG. 2 in the first switching position.
Figure 19:
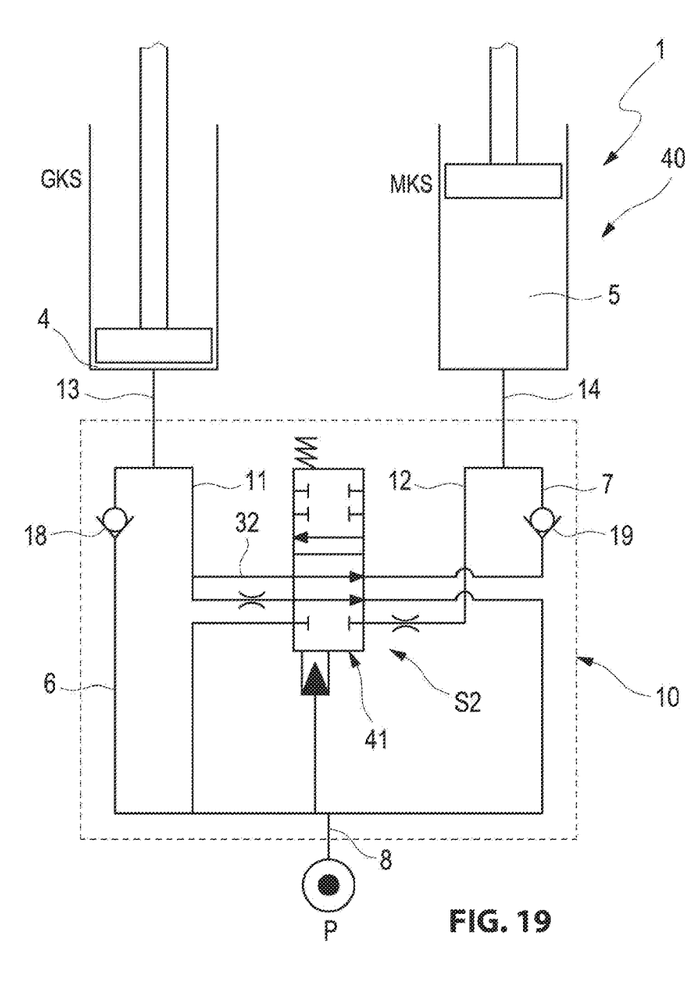
FIG. 19 illustrates a hydraulic diagram of the connecting rod according to the invention with the hydraulic module according to FIG. 2 in the second switching position.

The connecting rod 1 according to the invention is schematically illustrated in the hydraulic diagrams according to FIGS. 18 and 19 but known for example from DE 10 2013 107 127 A1 which is incorporated in its entirety by this reference.

As illustrated in FIGS. 18 and 19 the connecting rod 1 for an internal combustion engine with variable compression includes an eccentrical element adjustment device 40 that is not illustrated entirely and not illustrated in detail for adjusting an effective connecting rod length, The eccentrical element adjustment device 40 includes a first cylinder 4 and a second cylinder 5 configured as hydraulic chambers wherein respectively an inlet 6, 7 for feeding hydraulic fluid into the cylinders 4, 5 as well as a respective outlet 11, 12 for draining hydraulic fluid from the cylinders 4, 5 are provided. The hydraulic module 10 that is configured and functions as a switch valve 41 includes a step piston 17 that is movable in a housing 3 and which is optionally movable into a first switching position S1 or a second switching position S2, wherein an outlet 12 of the second cylinder 5 is connected with a supply conduit 8 in the first switching positon S1 and an outlet 11 of the first cylinder 4 is connected with the supply conduit 8 in the second switching positon S2.

The basic function of the switch valve 41 is also known from DE 10 2013 107 127 A1.

The cylinders 4, 5 in the hydraulic module 10 according to the invention are connected so that hydraulic fluid is conductible in the second switching position S2 from the first cylinder 4 into the second cylinder 5 through a channel 32 in the hydraulic module 10.

A switching element 36 for controlling the hydraulic fluid flow in the channel 32 is provided in the piston 17 of the hydraulic module 10 wherein the switching element is provided for example as a circumferential groove 27 of the piston 17 which forms a part of the channel 32. The hydraulic fluid flow in the channel 32 is switchable through the circumferential groove 27 by axially moving the piston 17 into the first switching position S1 or the second switching position S2. In the second switching position S2 the drain 11 of the first cylinder 4 is connectable through the circumferential groove 27 with the inlet 7 of the second cylinder 5. The cylinder 4 thus represents a hydraulic chamber on a gas force side (GKS) of the connecting rod 1, whereas the cylinder 5 represents a hydraulic chamber on the mass force side (MKS) of the connecting rod 2.

The cylinders 4, 5 are respectively associated with a check valve 18, 19 in the inlet 6, 7 wherein the check valve facilitates feeding hydraulic fluid into the cylinders 4, 5 and prevents draining hydraulic fluid from the cylinders 4, 5. Advantageously the invention only requires two check valves 18, 19. Additional check valves do not have to be provided. An inlet 6, 7 and an outlet 11, 12 of a cylinder 4, 5 respectively lead into a common conduit 13, 14 into the cylinder 4, 5.

The check valves 18, 19 are integrated into the hydraulic module 10 and include an essentially annular band element 33, 34 as a closure element wherein the closure element envelops the housing 3 at least partially at its circumference and is at least partially supported at the housing 3 and operating connections 21, 22 are closeable in a closed position of the closure element. The two check valves 18, 19 open in a radially outward direction. The band element 34 respectively includes at least one radial opening 35 that is arranged in its circumferential surface wherein the opening 35 is arranged as a slotted hole in a circumferential direction. Alternatively the band element 33, 34 can include at least one groove that is arranged on a radial inside at least on a circumference of the band element.

The drain 11 of the first cylinder 4 is connectable in the second switching position S2 through a transversal face bore hole 28 and/or a slanted bore hole 29 with the circumferential groove 27.

In a starting position the connecting rod 1 is in the switching position S1 for high compression $\varepsilon_{high}$. In this operating condition the GKS hydraulic chamber 4 is filled with hydraulic fluid, e.g. motor oil and the MKS hydraulic chamber 5 is connected with the supply conduit 8 through the outlet 12, advantageously in a throttled manner wherein the supply conduit 8 is connected with a supply source P. The step piston 17 of the hydraulic module 10 takes the position illustrated in FIGS. 3-7.

Figure 5:
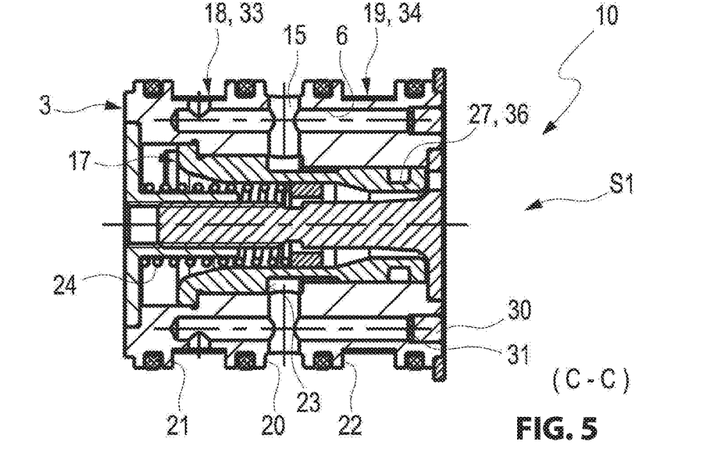
FIG. 5 illustrates a longitudinal sectional view in the sectional plane C-C of the hydraulic module according to FIG. 2 in the first switching position.
Figure 6:
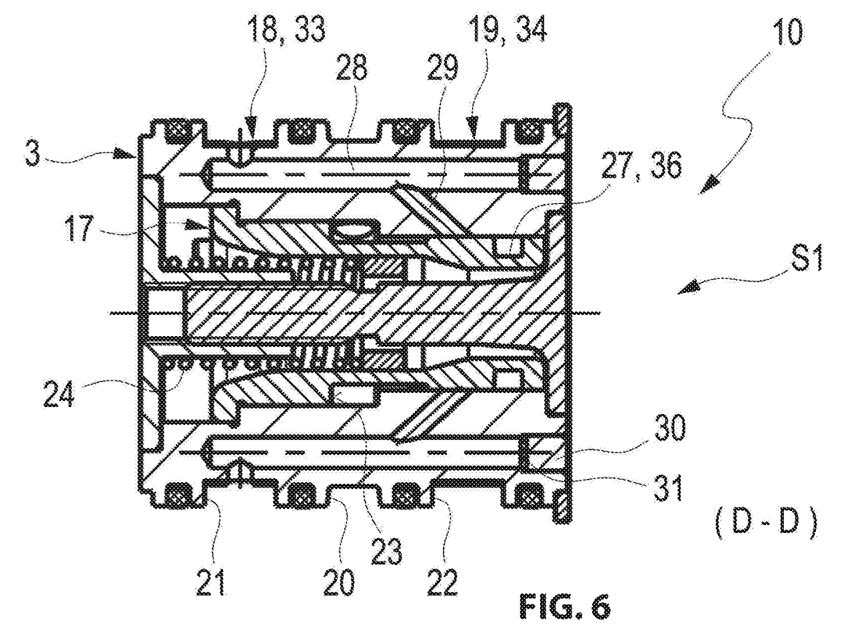
FIG. 6 illustrates a longitudinal sectional view in the sectional plane D-D of the hydraulic module according to FIG. 2 in a first switching position.
Figure 7:
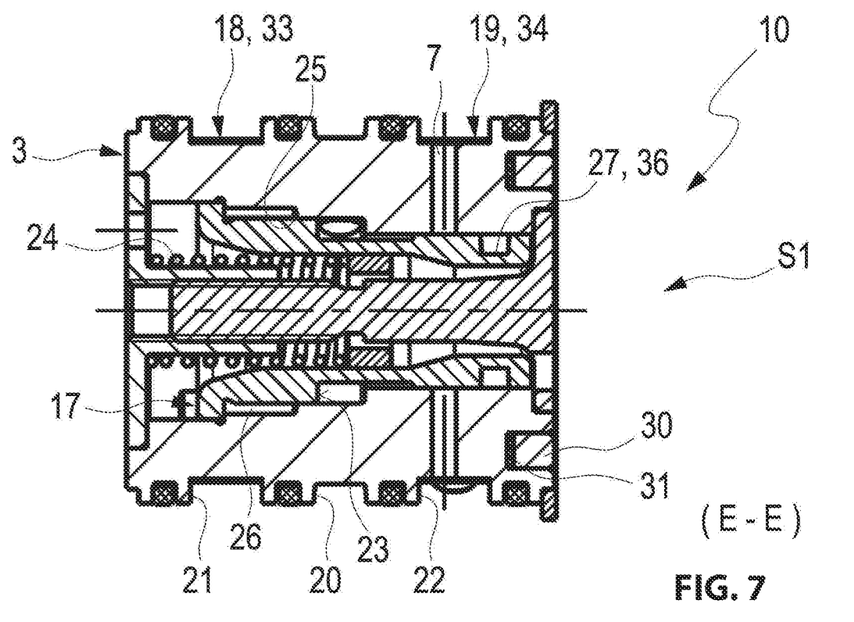
FIG. 7 illustrates a longitudinal sectional view in the sectional plane E-E of the hydraulic module according to FIG. 2 in a first switching position.

In this first switching position S1 at least a first operating connection 21 of the housing 3 of the hydraulic module 10 that is associated with the hydraulic chamber 4 is connected with a supply connection 20 that is connected with the supply conduit 8 as evident in particular from FIG. 5. The operating connection 21 which is openable by the check valve 18 in a direction towards the cylinder 4 wherein the check valve is configured as a band check valve is connected with the inlet 6 which is configured as a transversal bore hole or as plural transversal bore holes wherein the inlet is connected through one or plural radial bore holes 15 with the supply connection 20.

Figure 4:
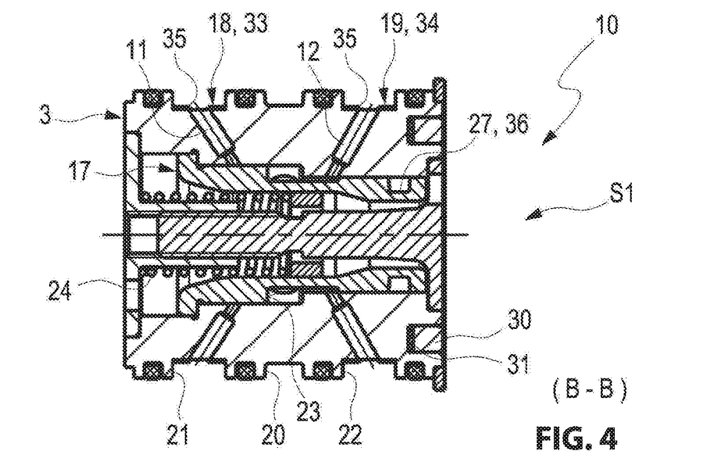
FIG. 4 illustrates a longitudinal sectional view in the sectional plane B-B of the hydraulic module according to FIG. 2 in a first switching position.

The outlet 11 that is connected with the first operating connection 21 and advantageously throttled is closed by the piston 17 as evident in particular from FIG. 4 in the longitudinal sectional view according to the sectional plane B-B of FIG. 1. A second operating connection 22 that is associated with the MKS hydraulic chamber is connected through the drain 12 and the radial bore hole 15 with the supply connection 20 so that the MKS hydraulic chamber 25 can empty. As evident from FIG. 4 this is implemented by a cut out of the step piston 17.

The supply connection 20 and the operating connections 21, 22 are configured as circumferential ring grooves into which the inlets 6, 7, the outlets 11, 12 and additional bore holes lead. All bore holes (inlet 6, 7, outlet 11, 12 etc.) in the housing 3 can be respectively provided as a single bore hole but they are advantageously uniformly distributed over the circumference of the housing 3.

When a pressure from the supply source P, e.g. the gallery pressure of the internal combustion engine is increased a pressure force impacting a face 23 of the step piston 17 exceeds the spring force of a spring 24 loading the piston 17 and the piston 17 moves against the spring force and reaches a position between the two switching position S1 and S2 illustrated in FIGS. 8-12.

Figure 8:
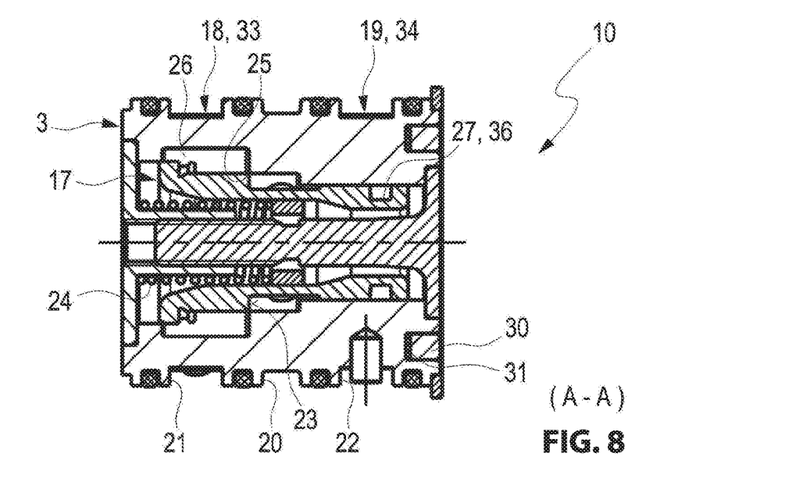
FIG. 8 illustrates a longitudinal sectional view in the sectional plane A-A of the hydraulic module according to FIG. 2 during a switching process.
Figure 9:
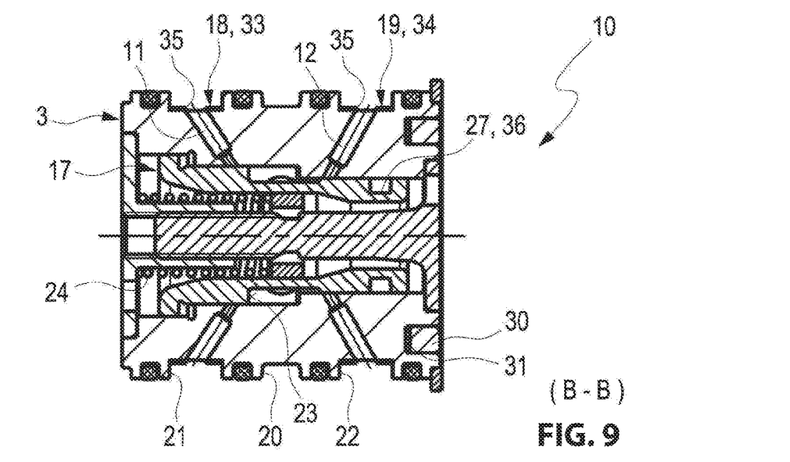
FIG. 9 illustrates a longitudinal sectional view in the sectional plane B-B of the hydraulic module according to FIG. 2 during a switching process.
Figure 10:
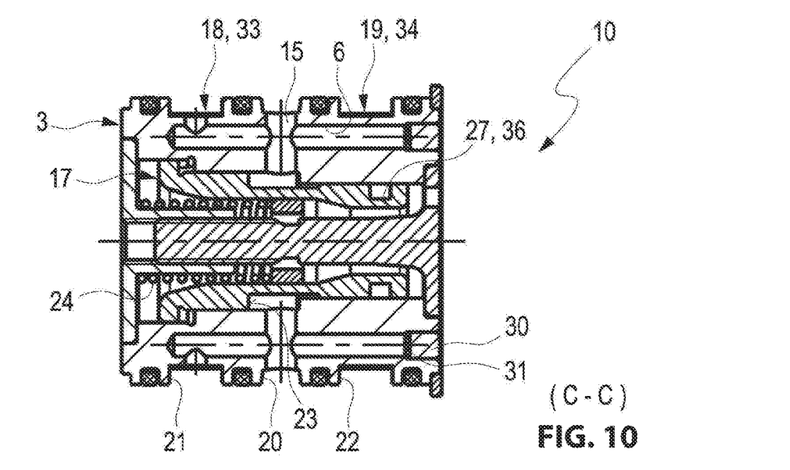
FIG. 10 illustrates a longitudinal sectional view in the sectional plane C-C of the hydraulic module according to FIG. 2 during a switching process.
Figure 11:
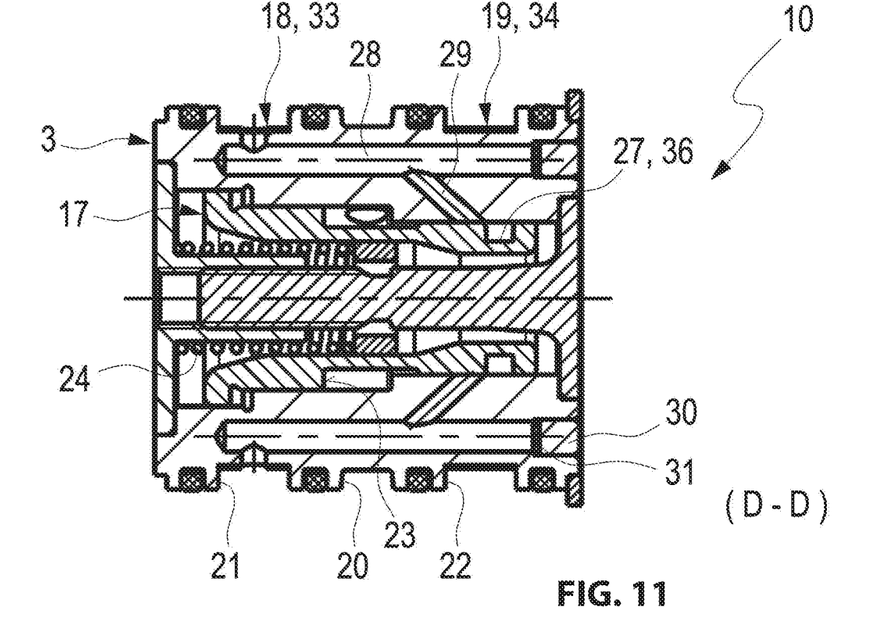
FIG. 11 illustrates a longitudinal sectional view in the sectional plane D-D of the hydraulic module according to FIG. 2 during a switching process.
Figure 12:
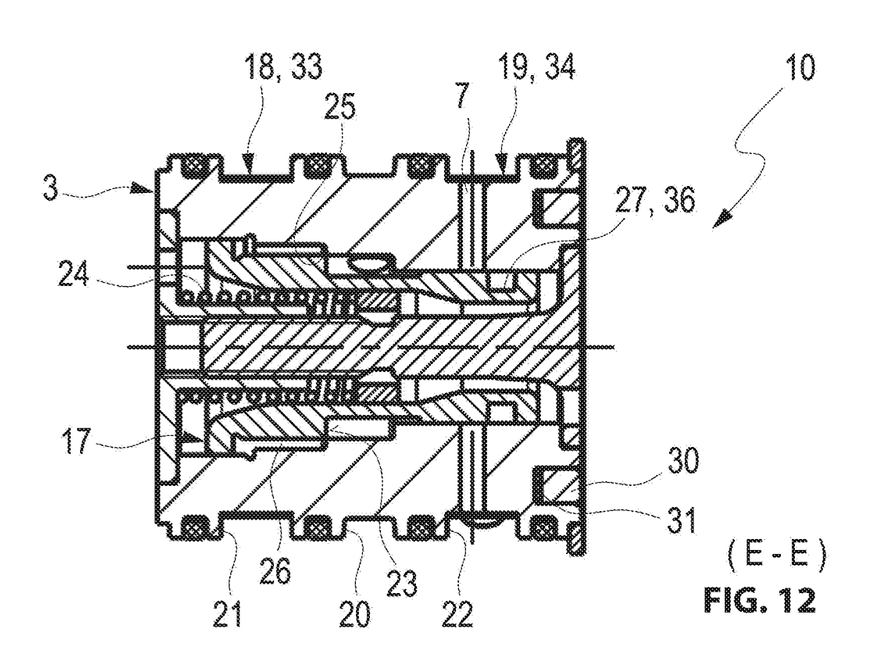
FIG. 12 illustrates a longitudinal sectional view in the section plane E-E of the hydraulic module according to FIG. 2 during a switching process.
Figure 13:
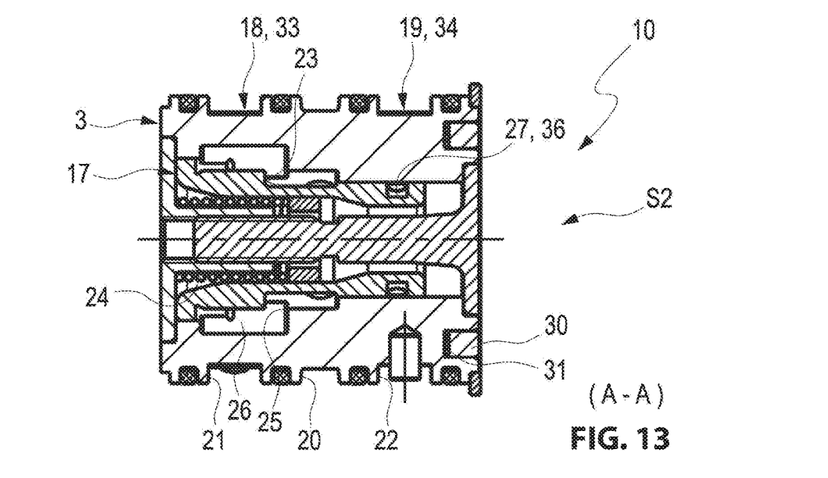
FIG. 13 illustrates a longitudinal sectional view in the sectional plane A-A of the hydraulic module according to FIG. 2 in a second switching position.
Figure 14:
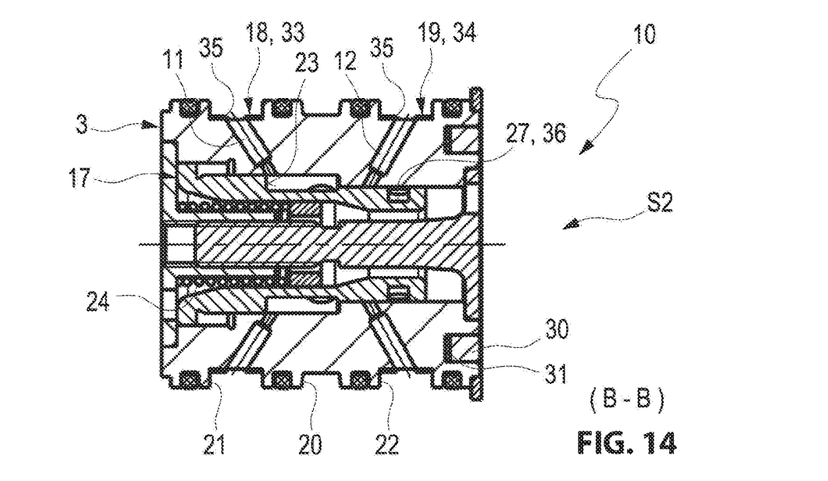
FIG. 14 illustrates a longitudinal sectional view in the sectional plane B-B of the hydraulic module according to FIG. 2 in a second switching position.
Figure 15:
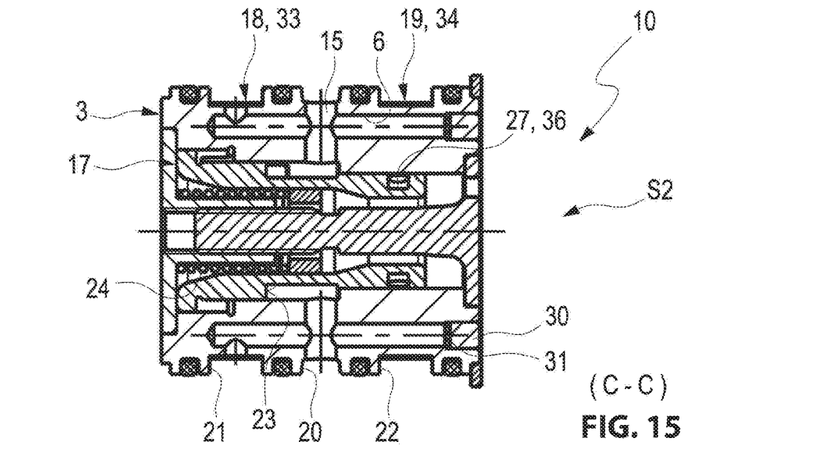
FIG. 15 illustrates a longitudinal sectional view sectional plane C-C of the hydraulic module according to FIG. 2 in a second switching position.

When performing a defined switching stroke the step piston 17 runs over an edge 25 of an overflow channel 26 which is evident from FIG. 8. From this point onward an effective pressure surface of the piston 17 increases rapidly so that the step piston 17 snaps into another end position or into the switching position S2 which is illustrated in FIGS. 13-17.

The hydraulic fluid from the GKS hydraulic chamber 4 can flow out through the outlet 11 and the supply connection 20 in a throttled manner towards P while the outlet 12 of the MKS hydraulic chamber 5 is closed by the step piston 17.

In the second switching position S2 hydraulic fluid is conductible according to the invention from the first cylinder 4 into the second cylinder 5 through a channel in the hydraulic module 10. Thus the piston 17 includes a circumferential groove 27 which is activatable and deactivatable by the switching positions S1, S2.

Figure 16:
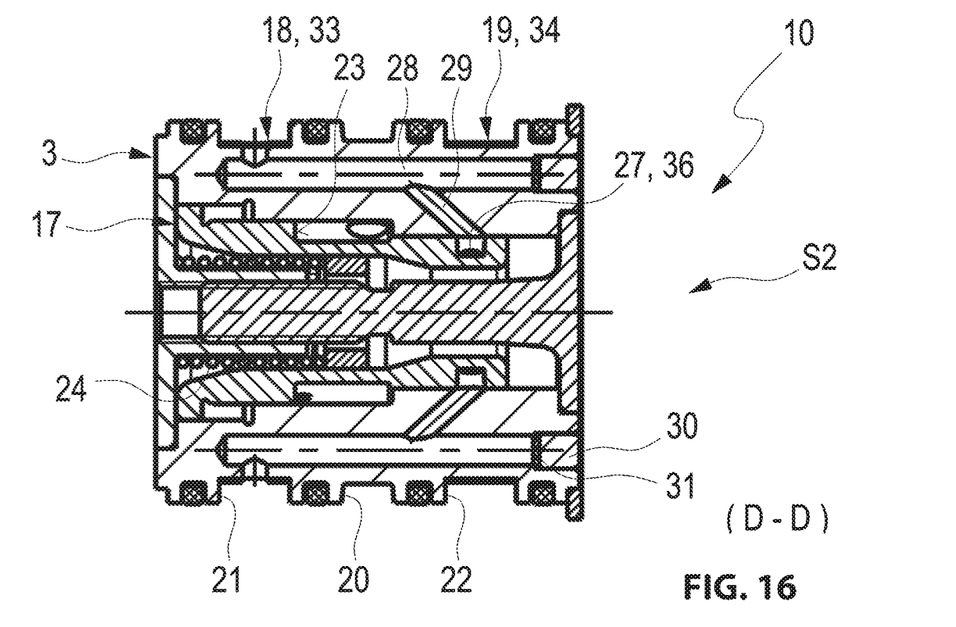
FIG. 16 illustrates a longitudinal sectional view in the sectional plane D-D of the hydraulic module according to FIG. 2 in a second switching position.
Figure 17:
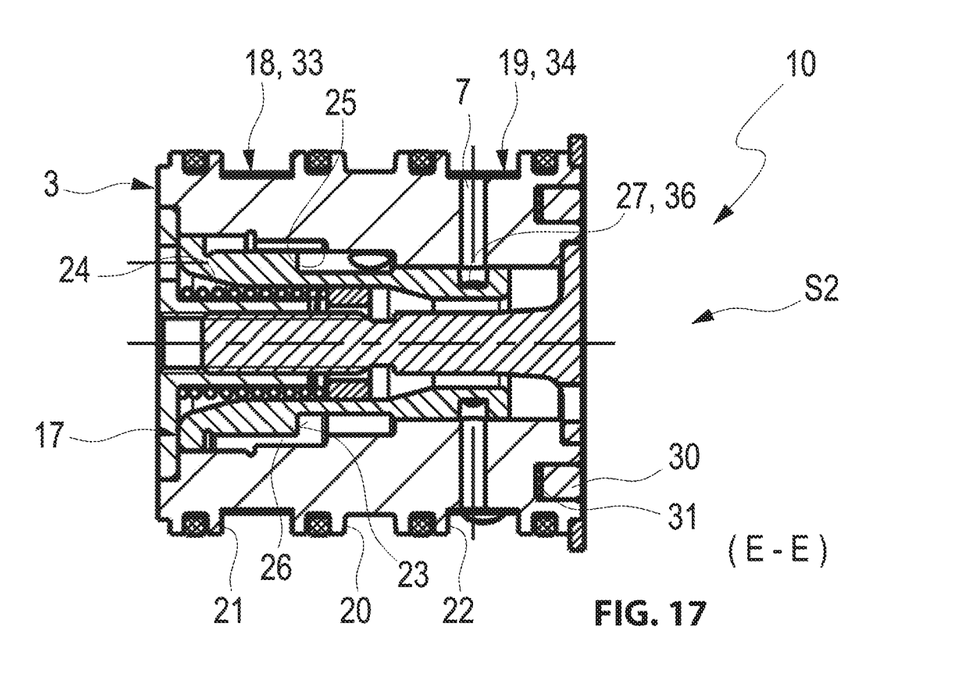
FIG. 17 illustrates longitudinal sectional view in the sectional plane E-E of the hydraulic module according to FIG. 2 in a second switching position.

As evident in particular from FIGS. 16 and 17 the drain 11 of the first cylinder 4 is connectable in an unthrottled manner by one or plural transversal face bore holes 28, one or plural slanted bore holes 29 and the circumferential groove 27 with the inlet 7 of the second cylinder 5.

Thus, the MKS hydraulic chamber 5 sucks hydraulic fluid (oil) from the circumferential groove 27 of the step piston 17 that is now connected with the GKS hydraulic chamber 4 through the check valve 19. Thus, it is assured that the MKS hydraulic chamber 5 is provided with hydraulic fluid with GKS chamber pressure. Thus, a more reliable filling of the MKS hydraulic chamber 5 is achieved compared to a direct suction from the supply source P at gallery pressure.

When the pressure in the hydraulic gallery of the internal combustion engine or of the supply connection P drops again the step piston 17 moves in the spring force direction back into the starting position, this means into the switching position Si. Since the pressure bearing surface, however, is still being enlarged the switching position of the step piston 17 in the other direction is only reached at a lower pressure. Hysteresis properties are established as illustrated in FIG. 20.

The band check valves 18, 19 are arranged along an outer circumference of the hydraulic module 10 which simplifies the overall system of the connecting rod. The band elements 33, 24 are provided with openings 35 like e.g. slots or holes in order to provide sufficiently large flow cross sections with a compact installation space, constant functionality and similar band stiffness. As evident from the schematic wiring diagrams according to FIGS. 18 and 19 only three bore holes are required for this purpose in the base element of the connecting rod 1 in order to operate the hydraulic module for advantageous operations of the eccentrical element adjustment arrangement 40.

In order to seal the additionally introduced bore holes relative to one another and in an outward direction a closure ring 30 is introduced in combination with a sealing disc 31 into the housing 3 and welded together with a face side of the housing 3.

Figure 20:
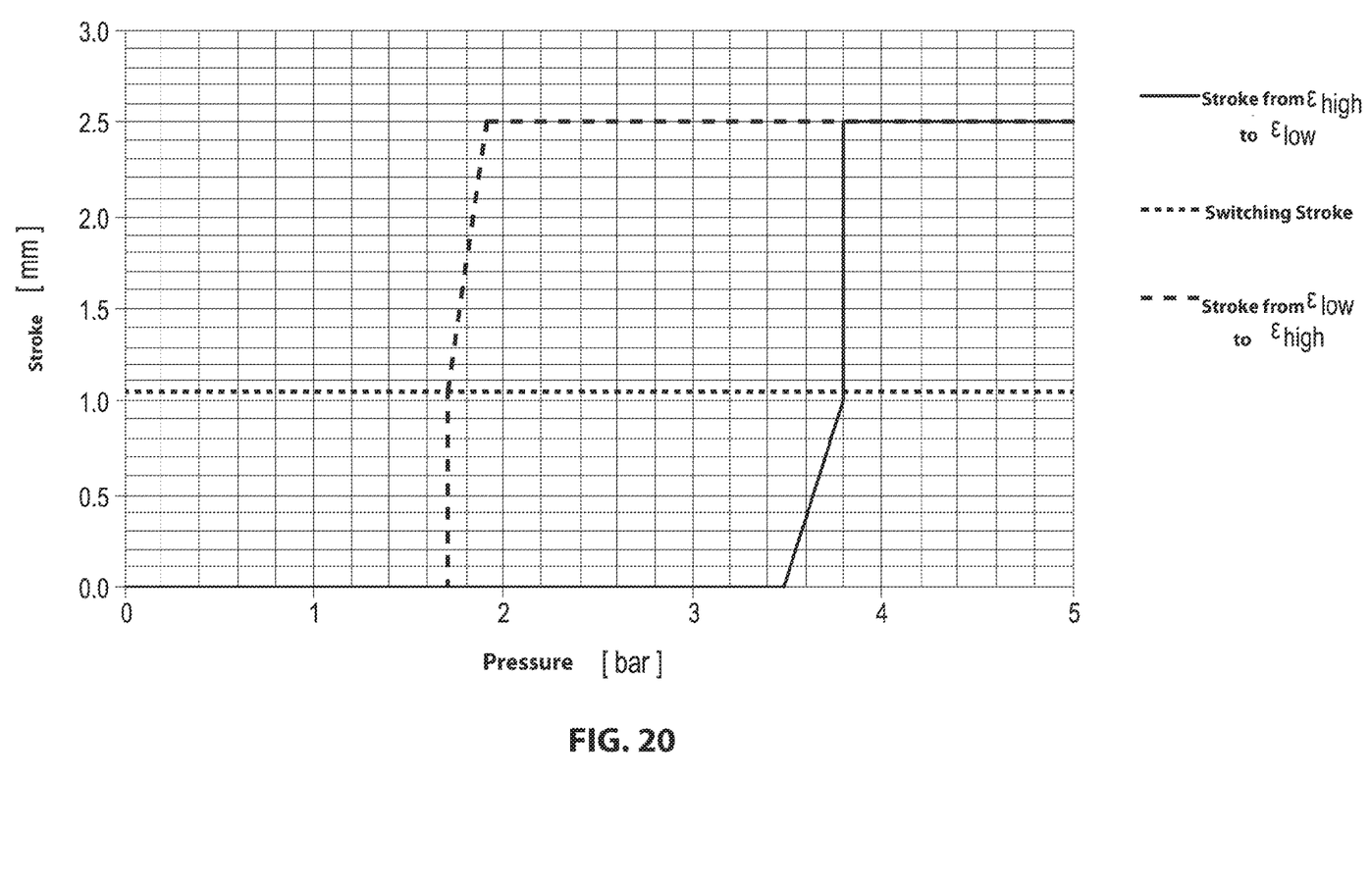
FIG. 20 illustrates a pressure-stroke diagram of the hydraulic module according to the invention with a hysteresis loop.

FIG. 20 illustrates a pressure/stroke diagram of the hydraulic module according to the invention with a hysteresis loop. The diagram illustrates a stroke of the step piston 17 with increasing pressure for a switching step from $\varepsilon_{high}$ to $\varepsilon_{low}$ (solid line) and a stroke for decreasing pressure for a switching process from $\varepsilon_{low}$ to $\varepsilon_{high}$ (long dashed line). Additionally the stroke during switching is plotted (short dashed line).

The illustrated hysteresis loop of the hydraulic module 10 is reflected in bi-stable properties of the connecting rod 1. When the pressure in the gallery or the supply source P is never increased beyond a predetermined switching pressure the connecting rod 1 is always in the operating condition $\varepsilon_{high}$. When exceeding the switching pressure the connecting rod 1 switches into the operating condition $\varepsilon_{low}$. This condition is maintained until the gallery pressure drops below a particular switching pressure which, however, is lower than in the preceding switching process.

The hydraulic module according to the invention thus provides an engineering solution for preloading the MKS hydraulic chamber 5 in combination with a hydraulic switch valve and integrated check valves 18, 19.

The hydraulic fluid supply of the MKS hydraulic chamber 5 through the gallery pressure can be advantageously deactivated and activated through a circumferential groove 27 in the step piston 17. For this purpose face bore holes 15, 28, 29 introduced into the housing 3 of the hydraulic module 10 are connected with each other.

As an alternative to a circumferential groove 27 in the piston 17 also a form contour on the step piston 17 is conceivable which opens a spring supported slide or slide system when a predetermined stroke is exceeded which in turn facilitates a connection between the MKS chamber 5 and the GKS hydraulic chamber 4.

A similar system could move two slanted planes over one another in one of the two end positons wherein the slanted planes in turn activate or deactivate an oil connection.

What is claimed is:

1. A connecting rod for an internal combustion engine with variable compression, the connecting rod comprising:
   an eccentrical element adjustment arrangement for adjusting an effective connecting rod length;
   a hydraulic module configured to control a hydraulic fluid flow of the connecting rod;
   wherein the eccentrical element adjustment arrangement includes at least a first cylinder and a second cylinder configured as hydraulic chambers,
   wherein a first inlet for feeding hydraulic fluid into the first cylinder through a supply conduit and a second inlet for feeding hydraulic fluid into the second cylinder through the supply conduit and a first outlet for draining hydraulic fluid from the first cylinder and a second outlet for draining hydraulic fluid from the second cylinder are provided,
   wherein the hydraulic module includes at least one piston that is displaceable in a housing into a first switching position or a second switching position,
   wherein the second outlet of the second cylinder is connected with the supply conduit in the first switching position and the first outlet of the first cylinder is connected with the supply conduit in the second switching position,
   wherein the first cylinder is associated with a first check valve and the second cylinder is associated with a second check valve wherein the first and second check valves facilitate feeding hydraulic fluid into the first cylinder and the second cylinder, respectively and prevent draining of the hydraulic fluid from the first cylinder and the second cylinder, respectively,
   wherein the first cylinder and the second cylinder are connected so that the hydraulic fluid flow is conductible in the second switching position from the first cylinder into the second cylinder through a channel in the hydraulic module, and
   wherein the hydraulic fluid flow is conductible in the second switching position through the channel in the hydraulic module to the second cylinder at a preload pressure that exceeds a supply pressure in the supply conduit.

2. The connecting rod according to claim 1, wherein a switching element is provided in the at least one piston for controlling the hydraulic fluid flow in the channel.

3. The connecting rod according to claim 2, wherein the switching element is provided as a circular groove on the at least one piston.

4. The connecting rod according to claim 2, wherein a circumferential groove of the at least one piston is provided as the switching element wherein the circumferential groove forms a portion of the channel.

5. The connecting rod according to claim 4, wherein the hydraulic fluid flow in the channel through the circumferential groove is switchable by an axial movement of the at least one piston into the first switching position or the second switching position.

6. The connecting rod according to claim 4, wherein the first outlet of the first cylinder is connectable in the second switching position through the circumferential groove with the second inlet of the second cylinder.

7. The connecting rod according to claim 4, wherein the first outlet, of the first cylinder is connectable in the second switching position through a transversal face bore hole or a slanted bore hole with the circumferential groove.

8. The connecting rod according to claim 7, wherein the first inlet and the transversal face bore hole of the housing are sealed by an annular seal disc or a closure ring.

9. The connecting rod according to claim 1, wherein the first check valve and the second check valve are integrated into the hydraulic module.

10. The connecting rod according to claim 9, wherein at least one of the first check valve arid the second check valve includes an annular band element as a closure element which at least partially envelops a circumference of the housing and which is at least partially supported at the housing and by which operating connections are closable in a closed position of the at least one of the first check valve and the second check valve.

11. The connecting rod according to claim 10, wherein the at least one of the first check valve and the second check valve opens in a radially outward direction.

12. The connecting rod according to claim 10, wherein the annular band element includes at least one radial opening that is arranged in a circumferential surface of the annular band element.

13. The connecting rod according to claim 12, wherein the at least one radial opening is configured as a slotted hole in the circumferential direction of the annular band element.

* * * * *